United States Patent [19]

Frye et al.

[11] Patent Number: 5,002,331

[45] Date of Patent: Mar. 26, 1991

[54] PEDAL ACTUATED VEHICLE DOOR CLOSER

[75] Inventors: Dale J. Frye, Holland; Jerry M. DeJong, West Olive, both of Mich.

[73] Assignee: Prince Corporation, Holland, Mich.

[21] Appl. No.: 535,405

[22] Filed: Jun. 8, 1990

[51] Int. Cl.[5] .................... B60J 5/04

[52] U.S. Cl. .................... 296/146; 49/357; 16/71

[58] Field of Search .................... 296/146, 903; 49/357; 16/71, 74

[56] References Cited

U.S. PATENT DOCUMENTS

| | | | |
|---|---|---|---|
| 452,084 | 5/1891 | Schmitz | 49/357 |
| 1,122,317 | 12/1914 | Simmons | 296/146 |
| 1,589,410 | 5/1925 | Milner | 296/146 |
| 1,607,062 | 2/1926 | Dowling | 296/146 |
| 1,806,488 | 12/1928 | Nagao | 296/146 |
| 1,896,311 | 4/1931 | Hinds | 296/146 |
| 1,991,611 | 3/1934 | Gano | 296/146 |
| 2,086,025 | 3/1936 | Gano | 296/146 |
| 2,610,084 | 9/1951 | Anderson | 49/460 |
| 2,809,030 | 10/1957 | Clark | 49/357 X |
| 3,061,362 | 9/1959 | Maruyama | 296/146 |
| 3,076,675 | 6/1961 | Lagace | 296/146 |
| 3,967,850 | 7/1976 | Whisler | 296/146 |
| 4,530,185 | 7/1985 | Moriya et al. | 49/280 |
| 4,644,693 | 2/1987 | Wang | 49/280 |

*Primary Examiner*—Margaret A. Focarino
*Assistant Examiner*—Gary c. Hoge
*Attorney, Agent, or Firm*—Price Heneveld Cooper DeWitt & Litton

[57] ABSTRACT

A door closing system includes a foot actuated pedal positioned conveniently near a vehicle door to be actuated, a flexible member having one end coupled to the pedal and a spring and interference fitting for coupling the flexible member to the door such that actuation of the pedal will provide a force to the door tending to close the door.

22 Claims, 1 Drawing Sheet

PEDAL ACTUATED VEHICLE DOOR CLOSER

BACKGROUND OF THE INVENTION

The present invention pertains to vehicles's doors and particularly to mechanism by which the doors can be closed using a foot actuated pedal.

Some modern vehicles, particularly two-door vehicles, have relatively large doors which typically swing wide open to a detented position for ingress and egress. When the vehicle operator or passenger sits in the vehicle, reaching the door handle to pull the door shut, can be somewhat difficult, particularly for persons of diminutive stature. Vehicles such as a 1990, two-door Lincoln Continental for example, will when the door is fully open, require a significant reach to grasp the door pulling handle. The door itself is very sturdy, somewhat heavy and therefore requires a significant pulling force while reaching out to close.

In the past, there has been provided linkage and cylinder mechanisms used for example on busses and other commercial vehicles for providing closure of a door which is difficult for the vehicle operator to reach. Also, systems have been proposed providing cylinders or motors for closing doors. U.S. Pat. No. 1,806,488 discloses a vehicle operator actuated pedal and link system for opening and closing a passenger door of a vehicle.

Such prior art construction is not usable in today's modern vehicles for a variety of reasons including the cost of the multiple linkage, motor driven or pneumatic systems involved. The bulk and weight of such structure is incongruous with today's vehicle construction and also such systems lack the esthetic appeal necessary in modern vehicle designs.

SUMMARY OF THE PRESENT INVENTION

The system of the present invention provides a relatively inexpensive, lightweight and compact system which can be readily installed in a vehicle and provide efficient and effective structure which is easily used by a vehicle operator for closing a vehicle door. Systems embodying the present invention include a pedal positioned conveniently near a vehicle door to be actuated, a flexible member having one end coupled to the pedal and means for coupling the flexible member to the door such that actuation of the pedal will provide a force to the door tending to close the door. In a preferred embodiment of the invention the flexible member is a web and the coupling means includes means for biasing the web in a stretched condition as the door closes. The pedal in the preferred embodiment is a foot pedal which is pivotally mounted to the vehicle's floor adjacent the door.

Such construction thereby provides a foot pedal actuated door closing system in which a relatively small, unobtrusive web of material couples a pivoted foot pedal to the vehicle door and extends within the door panel so as not to be visible. By utilizing a flexible web, the material can be easily retracted into the door and can bend and flex to extend between the door and foot pedal interface at angles necessary for intercoupling the door and pedal in a variety of vehicles. The system is relatively inexpensive and very effective in responding to a relatively light foot pressure for closing a somewhat heavy door.

These and other features, objects and advantages of the present invention, will become apparent by reading the following description thereof together with reference to the accompanying drawings in which:

DETAILED DESCRIPTION OF THE PREFERRED EMBODIMENT

Figure 1:
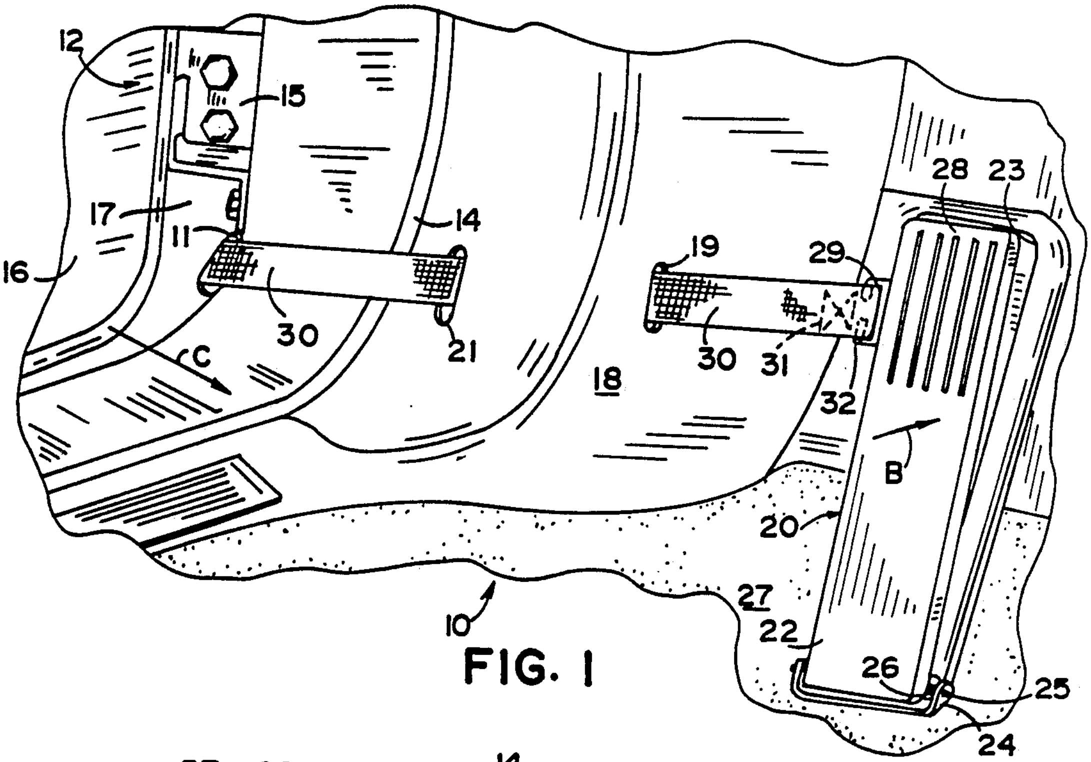
FIG. 1 is a fragmentary perspective view of a vehicle and a door incorporating the system of the present invention.

Referring initially to FIG. 1, there is shown a vehicle 10 embodying the present invention, and particularly the lower left corner of the interface between the driver's side door 12 and the quarter panel 14 to which the door is mounted by means of a pair of hinges with the lower hinge 15 being shown in FIG. 1. The vehicle shown can be any type of vehicle, although the invention is most useful in two-door vehicles which include relatively large doors which are somewhat lengthy and when fully open present a formidable effort for some individuals to close while seated in the driver's seat. The vehicle door 12 conventionally includes a cover panel 16 which is upholstered with a suitable fabric and which covers and conceals the various control mechanisms including the window actuating controls, door unlatching mechanism and other mechanical structures of the door. As such the decorative panel 16 extends inwardly from the outer sheet metal 17 of the door. Similarly, the front quarter panel 14 of the vehicle to which the door is attached includes a decorative cover 18 typically of a molded plastic material so as to be scuff resistant since it frequently is contacted by the user's foot when entering and egressing the vehicle. Panel 18 typically is contoured to provide a smooth interface between the door and the interior of the vehicle and will typically include significant empty space behind its outer surface.

Attached to the vehicle 10, is the system of the present invention which includes a foot pedal 20 which is pivotally mounted at its lower end 22 by means of a U-shaped pivot mounting bracket 24 conventionally secured to the vehicle floor and through which a pivot pin 25 extends and through an aperture 26 in end 22 of pedal 20. Typically, the lower end of pedal 20 will be covered by the floor mat 27. The pivot mechanism can also be incorporated on the floor facing the inner surface of the pedal so as not to be exposed. Other conventional pivot mounting means for the lower end of the pedal likewise can be employed.

Near the top of pedal 20 there is provided vertically extending treads 28 to facilitate engagement of the pedal by the foot of an individual and an edge positioned slot 29 through which one end 32 of a flexible member 30 is attached. Member 30 can be, such as a web, strap means which will transmit a tensil force but which will not stretch and yet flexes to bend as necessary around the vehicle door interface with the vehicle. In the preferred embodiment of the invention, end 32 is extended through slot 29 and then stitched in a loop at 31 to couple end 32 of the flexible material comprising web 30 to the upper end of the pedal in remote spaced relationship to the pivotally mounted end 22. Web 30 can by a Nylon woven web with a width of about 1 inch. Pedal 20 can be molded of any suitable polymeric material such as A.B.S. or the like.

Figure 2:
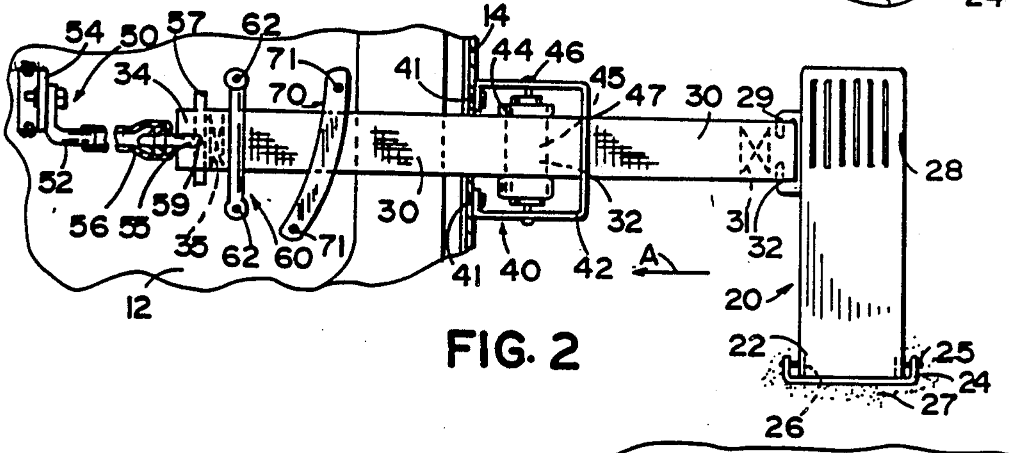
FIG. 2 is a fragmentary front elevational view, partly broken away and partly in cross-section of the system of the present invention mounted to the vehicle frame for guiding the flexible web shown in FIG. 1 through the vehicle side panel.

The decorative panel 18 includes a first forward slot 19 on its surface facing pedal 20 and a second rearward slot 21 on its surface facing the door and through which the web 30 extends. Within the decorative panel 18, there is provided as illustrated in FIG. 2, a web guide and control mechanism 40 which is secured to the quarter panel 14 of the vehicle behind panel 18. In FIG. 2 panel 18 has been removed to clearly illustrate this construction. The web guide and control mechanism 40 includes a generally U-shaped frame 42 secured to panel 14 by a pair of screws 41 at its upper and lower ends which can be sheet metal screws or the like. Rotatably positioned within the U-shaped frame 42 is a spool 44 which is rotatably mounted by means of a generally vertically extending axle 46. The spool includes a central annular recess 45 through which the web 32 passes and is captively held within the recess by means of the front wall 47 of the U-shaped member 42. Thus the web is captively and guideably supported within the panel 18 by the roller construction of the web guide mechanism 40. In some installations this structure may not be necessary and the web simply allowed to extend through slots 19 and 21 of the panel. In the preferred embodiment, however, the additional web guide and support means provides trouble-free control of the web as it moves through the quarter panel 18 during operation.

Figure 3:
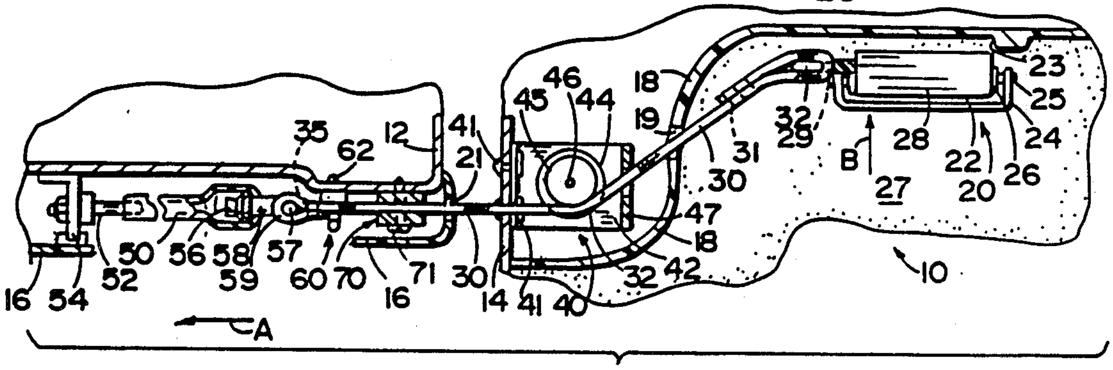
FIG. 3 is a top plan view, partly in cross-section and partly broken away, of the present invention.

The end 34 of web 30 remote from end 32 is floatably coupled to the vehicle door 12 by means of a spring bias means 50 as seen in FIG. 3. Bias means 50, in a preferred embodiment, comprises an approximate 1 foot length of ⅜ inch surgical tubing having an end 52 clamped to the vehicle door by clamp means 54 and its opposite end 56 coupled over a T-shaped interference fitting 55 secured to end 34 of web 30. The T-shaped fitting 55 includes a generally vertically extending leg 57 with an outwardly, horizontally extending leg 58 extending through an aperture 59 in the end 34 of the web which is folded over and stitched at 35 for securing the web to fitting 55. End 56 of tubing 50 fits over a serrated end of leg 58 and can be clamped thereto. In this manner, the web 32 is maintained in tension regardless of the position of the vehicle door. Thus as the vehicle door is closed, the web will be drawin in a direction to the left as shown by Arrow A in FIG. 3 through the slot 11 (FIG. 1) in the door panel 16 which has been removed in FIG. 3 to illustrate the door construction.

Mounted to the vehicle door in spaced relationship to hinge 15 mounting the door to the vehicle is a stop block 60 of generally U-shaped configuration and secured to the sheet metal door by means of screw fasteners 62 at either end and through which the web 30 can pass but through which the vertical leg 57 of the T-shaped interference fitting 55 cannot pass. Thus the web can slide through block 60 until such time as leg 57 engages block 60. With the door in a fully opened position, as illustrated in FIG. 1, the web will be in a position such that stop block 60 is engaged by legs 57 and the bias means 50 will be in a stretched or extended position tending to urge the web to the left as shown by Arrow A in FIG. 3.

Adjacent the lower corner of the door and behind slot 11 there is provided a web guide 70 which is also a U-shaped channel member secured to the vehicle door by fasteners 71 at either end and through which the web 30 can freely pass. In a preferred embodiment of the invention, the stop block 60 was mounted approximately 1 foot (12 inches) from the hinge 15 which provided sufficient torque upon acutation of the foot pedal 20 for closing of a relatively heavy door of a 1990, two-door, Lincoln Continental.

In operation, with the door open as shown in FIG. 1, the web 30 length is selected as is the bias means 50 to hold the web taut with member 57 adjacent stop block 60 within the door 12. In this position the web urges the foot pedal 20 to a raised position as illustrated in FIG. 1. A relatively light downward force on the foot pedal in a direction indicated by Arrow B in FIG. 1 will apply tension to the web 30 which is transmitted to the door through the interconnection of arm 57 of the T-shaped fitting 55 and stop block 60 mounted to the door to provide a door closing torque in a direction of Arrow C in FIG. 1 for closing the door. A remarkably slight foot pressure is required to initiate the door closing motion which then continues once the impetus of the door closing motion has been initiated. As the door closes, web tension is maintained while the spring 50 draws end 34 of the web 30 in a direction indicated by Arrow A to take up the slack in the web and maintain its tension so that it does not become caught between the door and the frame interface or between the pedal and the quarter panel. When the door is fully closed, the positioning of the bias means 50 with respect to end fitting 55 is such that the foot pedal 20 can freely lay downwardly in a recessed section 23 formed in the floor of the vehicle such that the pedal is completely flat and unnoticeable and forms a foot rest for the left foot of the vehicle driver. Thus only when the door is in an open position is the pedal raised to an operative position for closing the door as illustrated in FIG. 1.

The door closing pedal can likewise be positioned on the passenger's side of the vehicle with the arrangement being identical except reversed from that shown in the preferred embodiment of FIGS. 1–3. Similarly, rear passenger door closing foot pedals can also be provided. It will become apparent to those skilled in the art that various modifications to the preferred embodiment disclosed and described herein can be made by those skilled in the art without departing from the spirit or scope of the present invention as defined by the appended claims.

The embodiments of the invention in which an exclusive property or privilege is claimed are defined as follows:

1. A vehicle mounted pedal actuated door closer comprising;
   - a pedal movably mounted to a vehicle adjacent and forward of a vehicle door;
   - a flexible member having one end coupled to the pedal for movement with movement of said pedal; and
   - means for coupling an opposite end of said flexible member to the vehicle door such that when the door is in an open position the flexible member is generally taut and actuation of said pedal provides a door closing torque transmitted to the door through said flexible member.

2. The apparatus as defined in claim 1 wherein said means for coupling said flexible member to the door includes bias means for holding said flexible member in tension when the door is open and closing.

3. The apparatus as defined in claim 2 wherein said coupling means includes a stop member mounted to the vehicle door and through which said flexible member extends and an interference fitting coupled to said flexible member and engaging said stop member when said pedal is actuated with the door open to transmit a door closing force to the door.

4. The apparatus as defined in claim 3 wherein said bias means extends between the opposite end of said flexible member and the vehicle door and is in tension when the door is open.

5. The apparatus as defined in claim 4 wherein said flexible member comprises a web.

6. The apparatus as defined in claim 5 wherein said stop means comprises a generally U-shaped channel attached to the vehicle door in spaced relationship to a pivot coupling of the vehicle door to the vehicle.

7. The apparatus as defined in claim 6 wherein said pedal is pivotally mounted to the vehicle.

8. The apparatus as defined in claim 7 wherein said pedal is a foot actuated pedal having one end pivotally mounted to the vehicle floor and said web is secured to an opposite end of said pedal.

9. The apparatus as defined in claim 8 and further including web guide means mounted to the vehicle between said pedal and said interference fitting.

10. The apparatus as defined in claim 9 wherein said guide means includes a roller spool mounted within a quarter panel of the vehicle for captive guiding movement of said web.

11. The apparatus as defined in claim 10 wherein said guide means further includes a second generally U-shaped channel member mounted to the lower corner of the vehicle door for slideably guiding said web therethrough.

12. The apparatus as defined in claim 11 further including panel means mounted to the vehicle for defining a pedal receiving recess into which said pedal extends when the door is closed.

13. A vehicle mounted pedal actuated door closer comprising;

a foot pedal pivotally mounted to a vehicle floorboard adjacent and forward of a vehicle door; and strap means coupling the pedal to a vehicle door such that when the door is in an open position the flexible member is generally taut and depression of said pedal provides a door closing torque transmitted to the door through said strap means.

14. The apparatus as defined in claim 13 and further including bias means for holding said strap means in tension when the door is open and closing.

15. The apparatus as defined in claim 14 wherein said strap means includes a stop member mounted to the vehicle door and through which said strap means extends and an interference fitting coupled to said strap means and engaging said stop member when said pedal is depressed with the door open to transmit a door closing force to the door.

16. The apparatus as defined in claim 15 wherein said bias means extends between an end of said strap means opposite said pedal and the vehicle door and is in tension when the door is open.

17. The apparatus as defined in claim 16 wherein said strap means comprises a web.

18. The apparatus as defined in claim 17 wherein said stop means comprises a generally U-shaped channel attached to the vehicle door in spaced relationship to the pivot coupling of the vehicle door to the vehicle.

19. The apparatus as defined in claim 18 and further including web guide means mounted to the vehicle between said pedal and said interference fitting.

20. The apparatus as defined in claim 19 wherein said guide means includes a roller spool mounted within a quarter panel of the vehicle for captive guiding movement of said web.

21. The apparatus as defined in claim 20 wherein said guide means further includes a second generally U-shaped channel member mounted to the lower corner of the vehicle door for slideably guiding said web therethrough.

22. The apparatus as defined in claim 21 further including panel means mounted to the vehicle for defining a pedal receiving recess into which said pedal extends when the door is closed.

* * * * *